United States Patent
Pusheck

(10) Patent No.: US 10,401,201 B2
(45) Date of Patent: Sep. 3, 2019

(54) RATCHETING COVER FOR SENSOR HOUSING

(71) Applicant: Autoliv ASP, Inc., Ogden, UT (US)

(72) Inventor: Jacob Pusheck, Waterford, MI (US)

(73) Assignee: VEONEER US, INC., Southfiled, MI (US)

( * ) Notice: Subject to any disclaimer, the term of this patent is extended or adjusted under 35 U.S.C. 154(b) by 138 days.

(21) Appl. No.: 15/788,797

(22) Filed: Oct. 19, 2017

(65) Prior Publication Data
US 2019/0120666 A1    Apr. 25, 2019

(51) Int. Cl.
*G01D 11/24* (2006.01)

(52) U.S. Cl.
CPC ................... *G01D 11/245* (2013.01)

(58) Field of Classification Search
CPC .............................. G01D 11/24; G01D 11/245
USPC ........................................................... 73/431
See application file for complete search history.

(56) References Cited

U.S. PATENT DOCUMENTS

| | | |
|---|---|---|
| 6,244,107 B1 | 6/2001 | Nelson et al. |
| 6,322,275 B1 | 11/2001 | Schmidt et al. |
| 2004/0175988 A1 | 9/2004 | Chang et al. |
| 2006/0181859 A1 | 8/2006 | Thorum |
| 2007/0074583 A1 | 4/2007 | Santos et al. |
| 2015/0258953 A1 | 9/2015 | Murray, Jr. et al. |

OTHER PUBLICATIONS

International Search Report, International Application No. PCT/US2018/056270, dated Dec. 27, 2018, 3 pgs.

*Primary Examiner* — Jamel E Williams
(74) *Attorney, Agent, or Firm* — Brinks Gilson & Lione

(57) ABSTRACT

A mountable sensor assembly with a ratcheting cover attachment is provided. The sensor assembly may include a sensor circuit, a sensor housing, and a cover. The sensor housing may have walls that define a cavity with an opening for receiving the sensor circuit. The cover may be configured to extend over and seal the opening. The cover may be configured to interface with the walls through a ratcheting mechanism. The ratcheting mechanism may include a plurality of flexible latching fingers that engage solid ridges. The flexible latching fingers have one attached end and one unattached end, such that the flexible latching fingers deflect from the attached end.

20 Claims, 8 Drawing Sheets

RATCHETING COVER FOR SENSOR HOUSING

BACKGROUND

The present application relates generally to a ratcheting cover for a sensor housing.

BRIEF SUMMARY

The use of snap fit components as a method of assembly are increasing. This increase is due to the reduced cost and reduced manufacturing time required when using snap fit components. A problem with this method of assembly, however, is that it increases the possibility of contaminants reaching electronics that may be sealed in the components. This may be increasingly important with safety sensors. The implementations described aim to provide an alternative solution to classic snap fit designs and solve associated problems. A ratcheting interface could maintain the snap fit over Hie of the component with increased resistance to being dislodged or pulled off for any reason. The implementations described primarily cover the concept of a ratcheting interface method to assemble an electronic housing.

The present disclosure provides mounting for cover that uses a ratcheting, locking interface. One side may be solid barbs the other side may have a fixed edge and free moving edge to engage barbs in one direction and slip over barbs in other direction. Fixed and movable portions may be switched (e.g. on housing or cover). Further implementations may be used on either the inside or outside walls of housing or cover.

Further objects, features and advantages of this application will become readily apparent to persons skilled in the art after a review of the following description, with reference to the drawings and claims that are appended to and form a part of this specification.

BRIEF DESCRIPTION OF THE DRAWINGS

In the accompanying drawings the components are not necessarily to scale, emphasis instead being placed upon illustrating the principles of the application. Moreover, like reference numerals designate corresponding parts throughout the views.

DETAILED DESCRIPTION

One aspect of the implementations described in this application is the concept of an interlocking ratchet system to fix a cover to an assembly. To allow for the assembly to be water tight, the design may include a deformable gasket to be used to protect the internals from the outside environment. This gasket would introduce a force that would counter the ratchet system over the life of the assembly.

Another aspect of the described implementations is the use of multiple deforming features to allow increased distribution of stress along the mating features of a ratcheting cover. This increased distribution of stress would increase the robustness of the part and provide a secondary level of safety if the first layer of deformable components were to be broken off.

The implementations described can provide a more robust alternative to the traditional snap fit methods of assembly. Additionally, these implementations can increase the robustness by adding a second layer of resistance to the cover being pulled off, as well as, increased distribution of the stresses that might cause the cover to be compromised.

Figure 1:
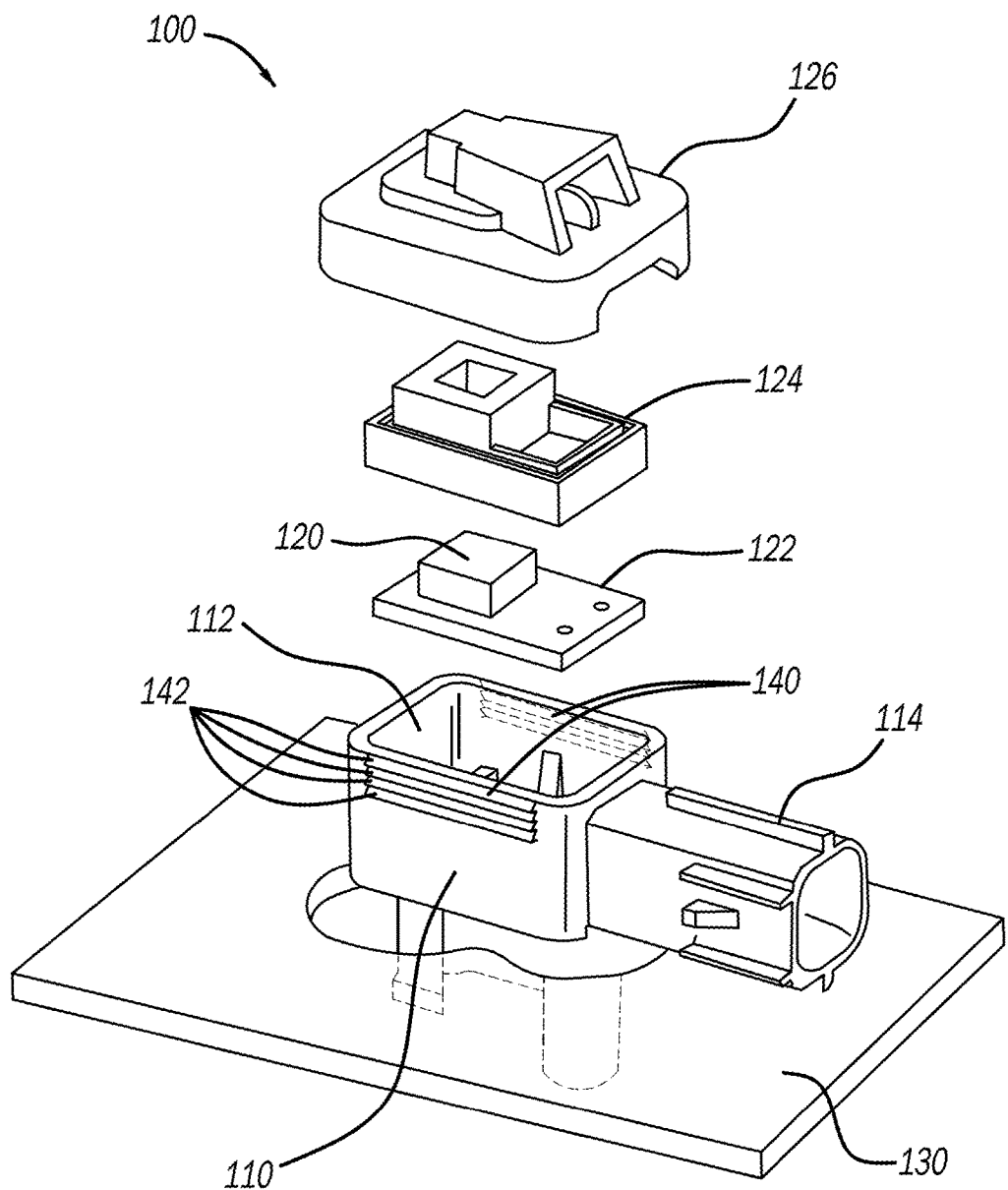
FIG. 1 is an exploded view of a sensor assembly.

FIG. 1 illustrates an exploded view of sensor assembly 100. The sensor assembly 100 includes a housing 110, a sensor 120, a gasket 124 and a cover 126. The sensor assembly 100 may be attached to a sheet metal panel 130 of the vehicle. As such, the sensor 120 may be an accelerometer, gyroscope, pressure sensor, sound sensor, or other vehicle safety sensor. The housing 110 may include a cavity 112 to receive the sensor 120. In some implementations, the sensor 120 may be attached to a printed circuit board 122. In other implementations, the sensor 120 may be mounted directly into the housing 110. The housing 110 may also include a connector portion 114. As such, the sensor 110 may be electrically connected to pins located within the connector portion 114. The gasket 124 may be located between the sensor 120 and the cover 126. As the cover is seated on the housing 110, the gasket 124 may provide sealing between the cover 126 and the housing 110, preventing moisture or other elements from travelling into the cavity 112. The cover 126 and the housing 110 may include one or more ratchet assemblies having a first portion 140 on the housing 110 and second portion (not shown) on the cover 126. In the implementation shown, the ratchet portion 140 on the housing 110 is located on the outside surface, however, the ratchet portion may be located on the inside surface within the cavity 112 in some implementations. Accordingly, the ratchet portion on the cover could then be within an inside ring or on the outside surface of the cover 126.

Figure 2:
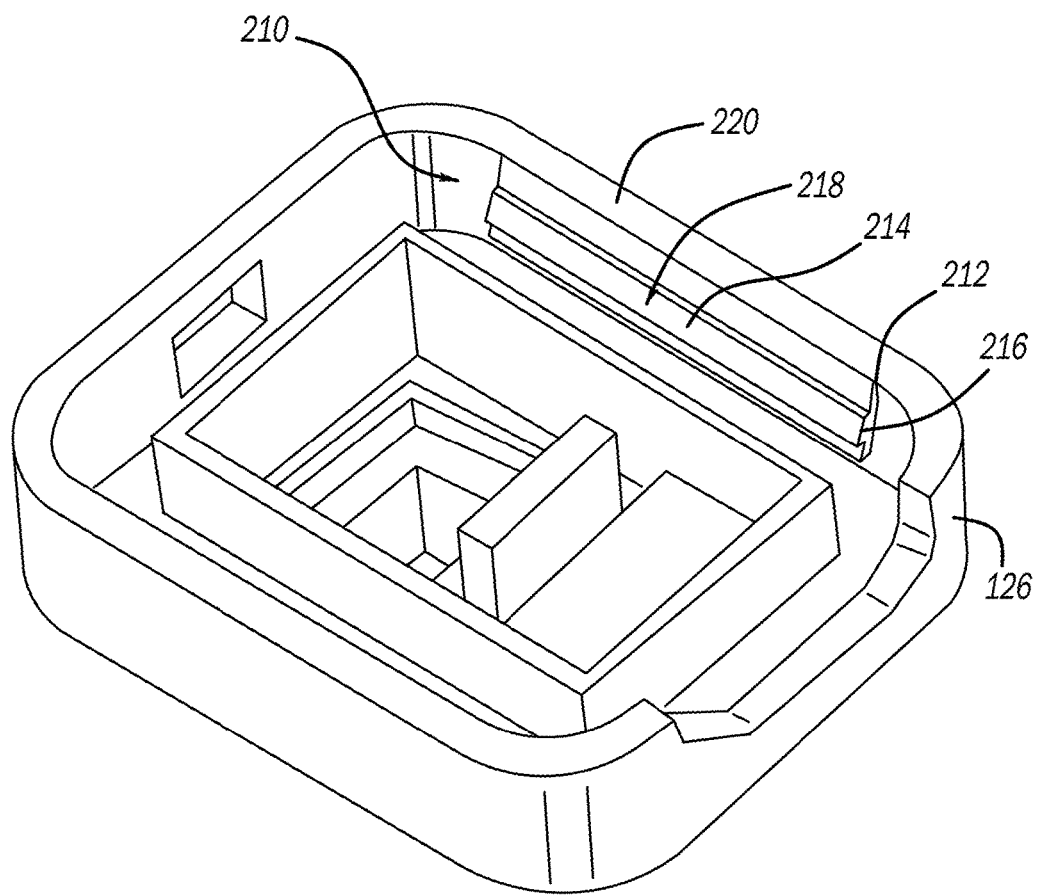
FIG. 2 is a perspective view of the interior of the cover for the sensor assembly.

FIG. 2 is an perspective view of the interior of the cover 126. The cover 126 may have a ratcheting portion 210 located on an inside surface of the cover 126. The ratcheting portion 210 may interface with the ratcheting portion 140 on the outside surface of the cover 110. As shown in FIG. 1, the ratcheting portion 140 on the outside surface of the cover 110 may be fixed, solid ridges (e.g., triangles or barbs). The ratcheting portion 210 on the inside surface of the cover 126 may include one or more flexible latching fingers 218. The flexible latching fingers 218 may have an attachment point 212 on an interior surface of and toward the distal end of a peripheral wall 220 of the cover 126, and a free end 216 that extends from and is not attached to the peripheral wall of the cover 126. However, in some implementations, the free end 216 may be loosely or movably attached to the peripheral wall 220 of the cover 126. Further, the ratcheting portion 210 may include a latching portion 214, such as an edge or ridge, configured to engage the barbs 142 or triangles of the ratcheting portion 140 on the housing 110. As the ratcheting portion 210 is pushed over each barb 142 of the ratcheting portion 140, each flexible latching finger 218 deflects and then clicks and locks in against each successive barb 142 as it passes over the apex of the barb 142. This provides a ratcheting effect where pushing down the cover 126 relative to the housing 110 will create multiple successive locking latches on each next successive barb 142 of the ratcheting portion 140.

Figure 3:
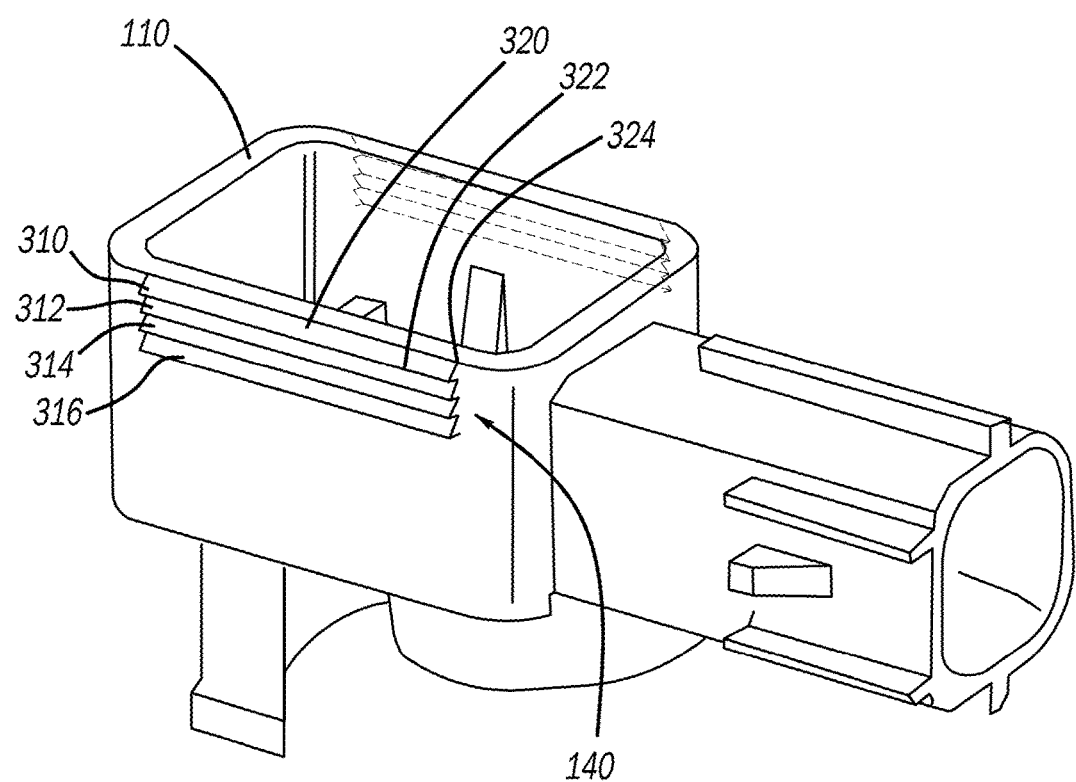
FIG. 3. Is a perspective view of the housing illustrating one implementation of the ratcheting portion.

FIG. 3 is a perspective view of the housing 110 illustrating the ratcheting portion 140 in more detail. The ratcheting portion 140 may include multiple barbs, for example four barbs. As shown, the ratcheting portion 140 includes barb 310, 312, 314, and 316. Each barb is located in linear succession. Further, each barb includes a surface 320 that protrudes outwardly with a locking edge 322 that is configured to catch against the ratcheting portion 210 of the cover 126. Each barb may be solid and may be non-deformable as illustrated by the triangular cross-section 324.

The ratcheting features (e.g. flexible latching fingers 218) on the cover 126 may extend inward while the ratcheting features (e.g. barbs 310) on the housing 110 may extend outwardly. Although, the ratcheting features may be switched such that the flexible latching fingers extend outward from the housing 110 and the barbs extend inward from the cover 126.

Figure 4:
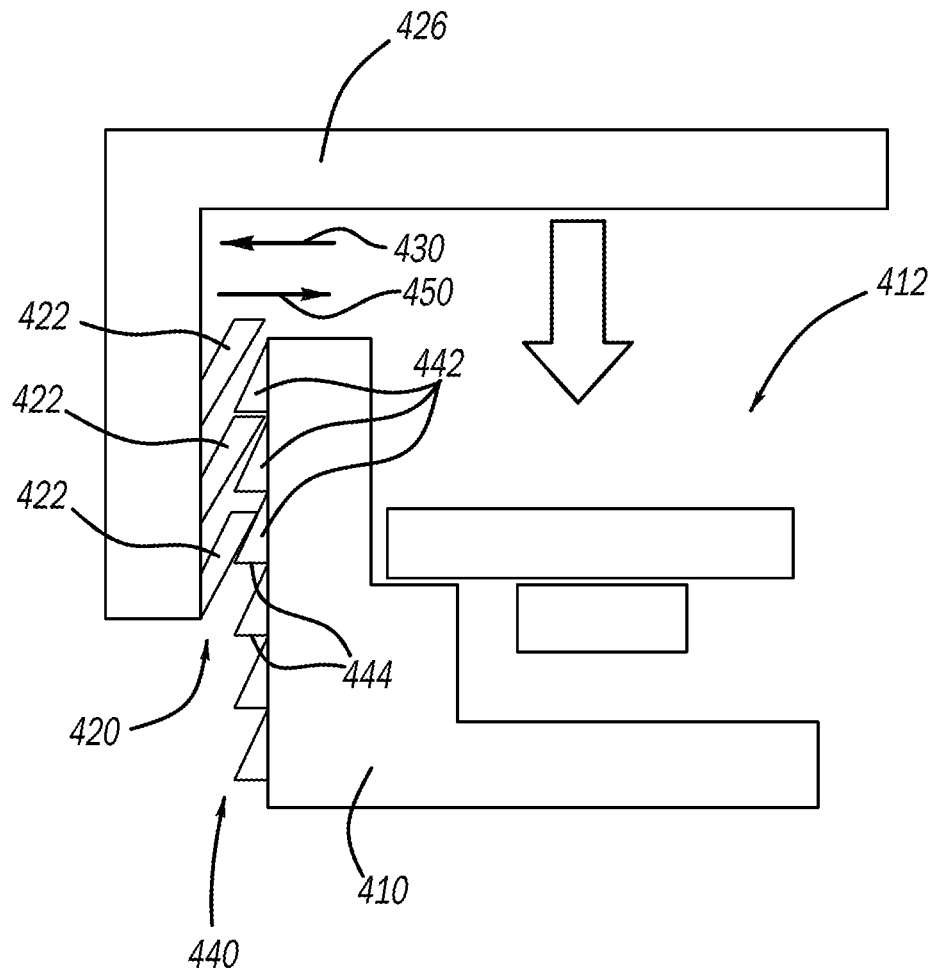
FIG. 4 is a schematic view of the interaction between the ratcheting portions on the cover and the housing.

FIG. 4 is a schematic view of the interaction between the ratcheting portions on the cover 426 and the housing 410. The cover 426 may include ratcheting portion 420 including a plurality of flexible latching fingers 422. The housing 410 includes a ratcheting portion 440. The ratcheting portion 440 includes a plurality of solid stationary barbs 442. Accordingly, as the cover 426 is pressed over the housing 410, the flexible latching fingers 422 deflect, as illustrated by arrow 430, as they slide over the apexes of the solid stationary barbs 442. As the flexible latching fingers 422 pass the apex of a barb 442, the latching finger springs back as illustrated by arrow 450 thereby engaging a retention surface 444 of the corresponding barb 442. As the cover 426 is pushed onto the housing 410 with increasing force, the flexible latching fingers 422 are pushed across more barbs 442, causing increasing retention force between the cover 426 and the housing 410.

Figure 5:
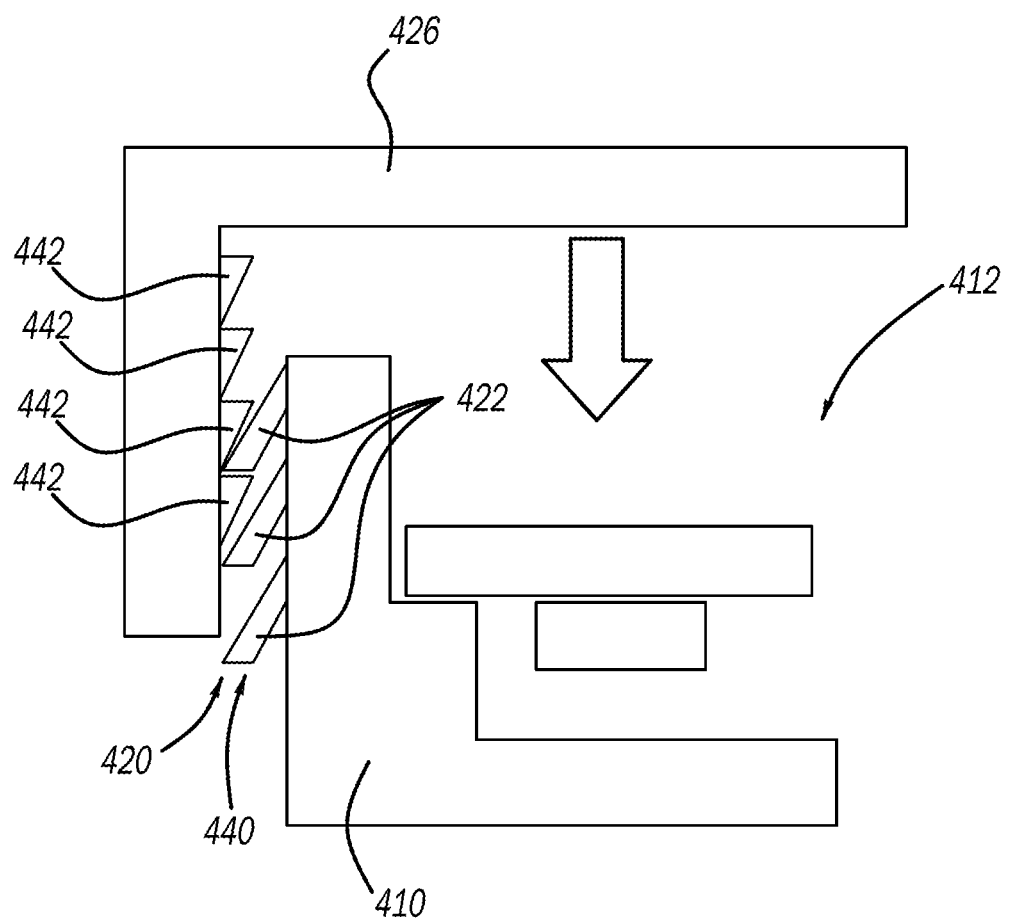
FIG. 5 is a schematic view of another implementation of the interaction between the ratcheting portions on the cover and the housing.

FIG. 5 illustrates an implementation where stationary barbs 442 are located on the inside of the cover 426 and the flexible latching fingers 422 are located on the housing 410. The cover 426 may include ratcheting portion 420 including a plurality of stationary barbs 442. The housing 410 includes a ratcheting portion 440. The ratcheting portion 440 includes a plurality of flexible latching fingers 422. Accordingly, as the cover 426 is pressed over the housing 410, the flexible latching fingers 422 deflect as they slide over the solid stationary barbs 442. As each flexible latching finger 422 passes over the apex of a barb 442, the flexible latching finger 422 springs back, thereby engaging the retention surface of the corresponding barb 442. As the cover is onto the housing 410 with increasing force, the flexible latching fingers 422 are pushed across more barbs 442, causing increasing retention force between the cover 426 and the housing 410. The ratcheting features (e.g. flexible latching fingers 422) on the cover 426 may extend inward while the ratcheting features (e.g. barbs 442) on the housing 410 may extend outwardly. Although, the ratcheting features may be switched such that the flexible latching fingers 422 extend outward from the housing 410 and the barbs 442 extend inward from the cover 426.

Figure 6:
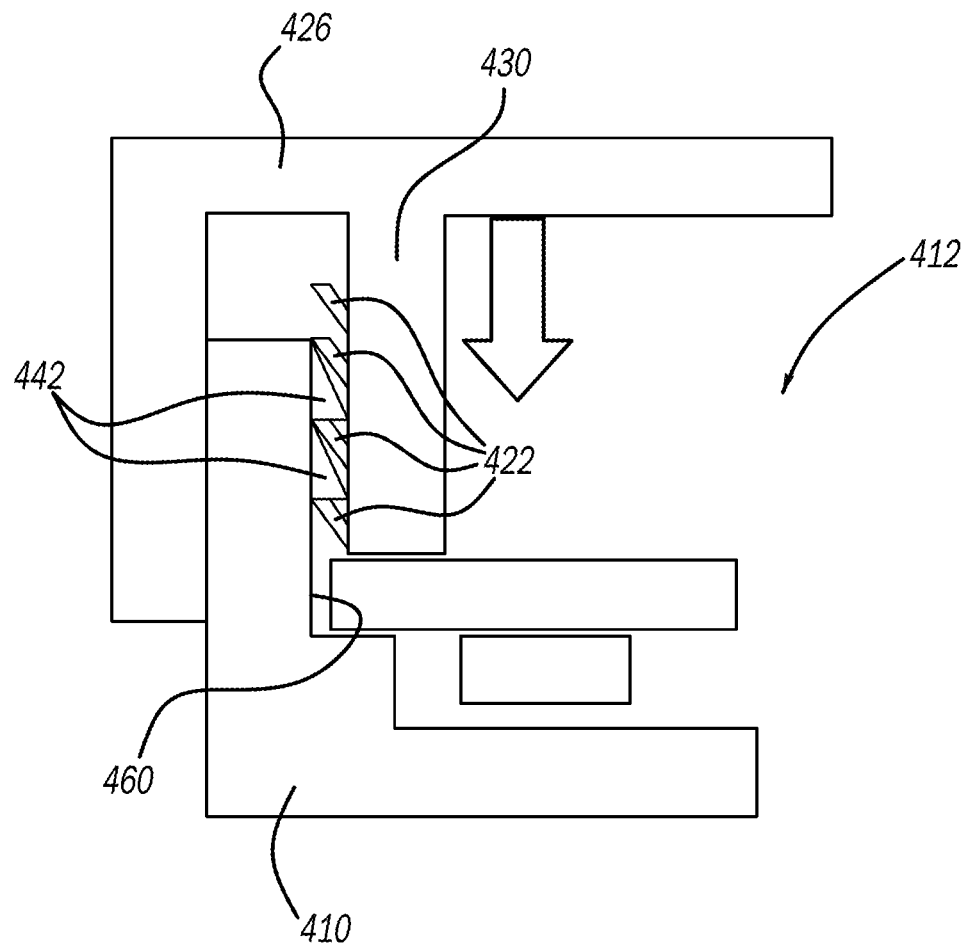
FIG. 6 is a schematic view of another implementation of the interaction between the ratcheting portions on the cover and the housing.

FIG. 6 is a schematic view of an implementation where the latching fingers 422 are located in a pocket 430 of the cover 426. The barbs 442 are located on an inside surface 460 of the housing 410. The barbs 442 will interact and lock with the flexible latching fingers 422 as described in the previous implementations. Further, other similar implementations are contemplated herein for example, flexible latching fingers 422 may be located on the inside surface 460 of the housing 410 and the barbs 442 may be located in the pocket 430 of the cover 426. The ratcheting features (e.g. barbs 442) on the housing 410 may extend inward while the ratcheting features (e.g. flexible latching fingers 422) on the cover 426 may extend outwardly. Although, the ratcheting features may be switched such that the barbs 442 extend outward from the cover 426 and the flexible latching fingers 422 extend inward from the housing 410.

Figure 7:
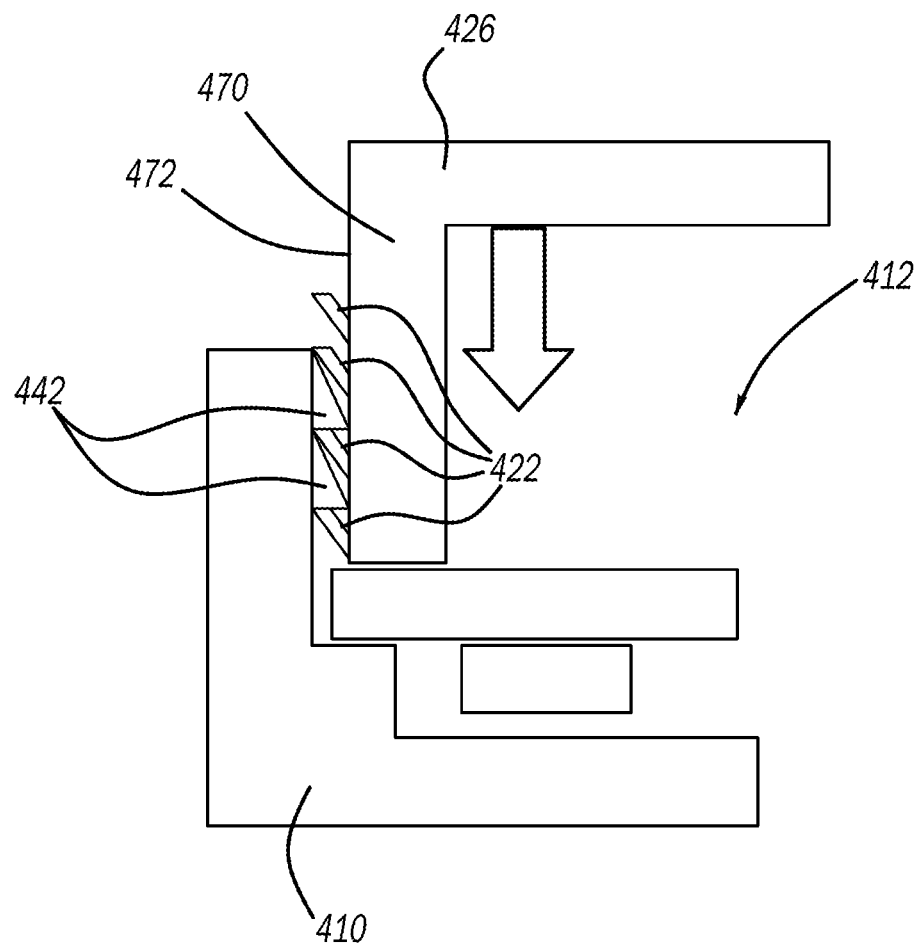
FIG. 7 is a schematic view of another implementation of the interaction between the ratcheting portions on the cover and the housing.

In addition, other implementations may be contemplated where the peripheral wall 470 of the cover 426 fits into the cavity 412 of the housing 410 such that the pocket 430 is not used, and ratcheting mechanism 440 on the inside surface of the housing 410 directly engage the ratcheting mechanism 420 on the peripheral wall 470 of the cover 426, as shown in FIG. 7. As such, the barbs 442 or the flexible latching fingers 422 may be located on the outer surface 472 of the peripheral wall 470 of the cover 426, and the corresponding flexible latching fingers 422 or barbs 442 may be located on the inside surface 460, within the cavity 412 of the housing 410.

Figure 8:
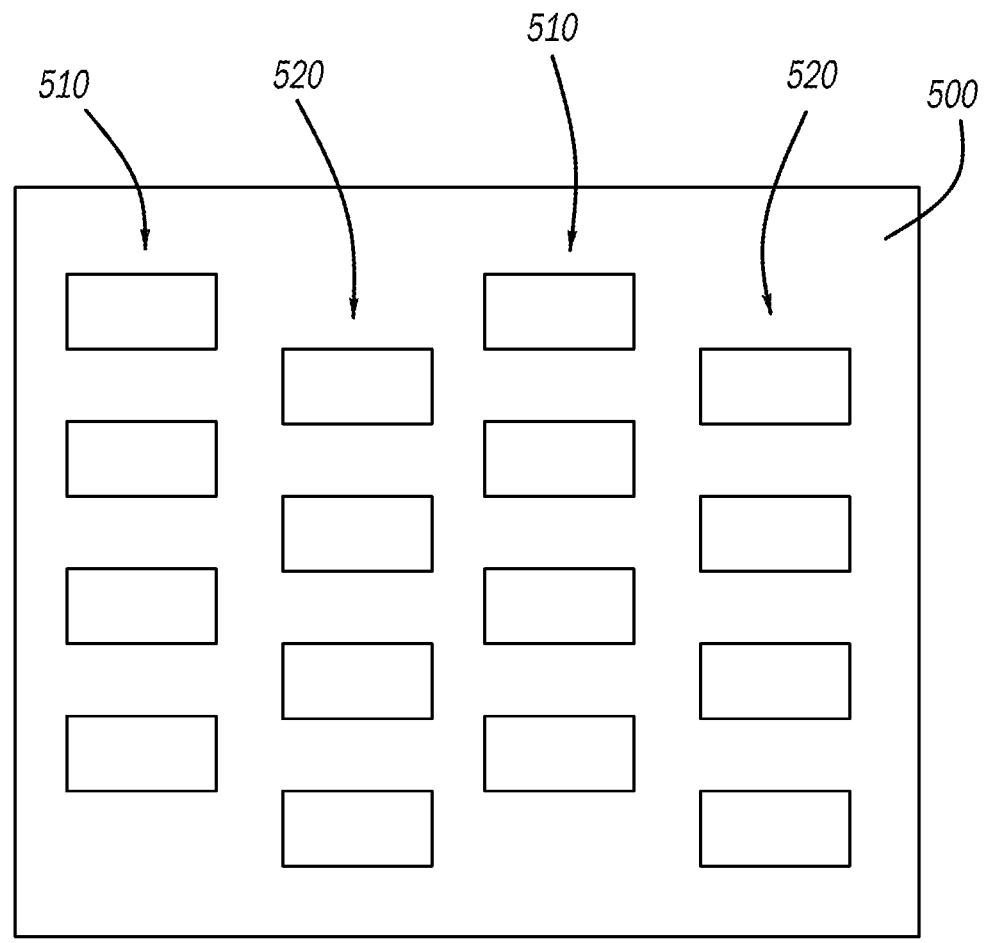
FIG. 8 is a schematic view alternating rows of ratcheting fingers or barbs.

FIG. 8 is a schematic view of alternating columns of ratcheting fingers or barbs. The alternating columns may be used to increase the frequency of engagement and increase granularity of compression. Surface 500 may include a ratcheting mechanism for example, either the ratcheting fingers or the interacting barbs. The ratcheting fingers and/or barbs may have an alternating pattern of columns to generate an increased frequency of contacts. As shown, the surface 500 includes a first set of columns 510 of ratcheting fingers or barbs that are offset relative to a second set of columns 520 of ratcheting fingers or barbs that provide an increased frequency using spatially offset rows. In some implementations, the rows in the first set of columns may have a higher frequency than the rows in the second set of columns. It can be understood from the diagram a complimentary surface having the opposite of either ratcheting fingers or barbs may interact with the surface 500 to lock the cover to the housing with an increased amount of granularity or compression for sealing the sensor assembly.

As a person skilled in the art will readily appreciate, the above description is meant as an illustration of the principles of this application. This description is not intended to limit the scope or application of the claim in that the assembly is susceptible to modification, variation and change, without departing from spirit of this application, as defined in the following claims.

What is claimed is:

1. A mountable sensor assembly comprising:
   a sensor circuit;
   a sensor housing having walls that define a cavity with an opening for receiving the sensor circuit; and
   a cover configured to enclose and seal the opening, the cover being configured to interface with the walls of the housing through a ratcheting mechanism.

2. The assembly of claim 1, wherein the ratcheting mechanism includes flexible latching fingers that engage solid ridges.

3. The assembly of claim 2, wherein the flexible latching fingers have one attached end and one unattached end such that the flexible latching fingers deflect from the attached end.

4. The assembly of claim 1, wherein the cover comprises flexible latching fingers that engage solid ridges on the walls of the housing.

5. The assembly of claim 1, wherein the cover comprises flexible latching fingers on an inside surface of the cover that engage solid ridges in an outside surface the walls of the housing.

6. The assembly of claim 1, wherein the cover comprises flexible latching fingers on an outside surface of the cover that engage solid ridges in an inside surface the walls of the housing.

7. The assembly of claim 1, wherein the walls comprise flexible latching fingers that engage solid ridges in the cover.

8. The assembly of claim 1, wherein the walls comprise flexible latching fingers on an inside surface of the walls that engage solid ridges in an outside surface of the cover.

9. The assembly of claim 1, wherein the walls comprise flexible latching fingers on an outside surface of the walls that engage solid ridges in an inside surface of the cover.

10. The assembly of claim 1, wherein the ratcheting mechanism comprises a first set of flexible latching fingers that are offset from a second set of flexible latching fingers.

11. The assembly of claim 10, wherein the first set of flexible latching fingers form a first set of columns and the second set of flexible latching fingers form a second set of columns, rows in the first set of columns being offset from rows in the second set of columns.

12. The assembly of claim 11, wherein the rows in the first set of columns have a different frequency than rows in the second set of columns.

13. The assembly of claim 1, wherein the ratcheting mechanism comprises a first set of solid ridges that are offset from a second set of solid ridges.

14. The assembly of claim 13, wherein the first set of solid ridges form a first set of columns and the second set of solid ridges form a second set of columns, rows in the first set of columns being offset from rows in the second set of columns.

15. The assembly of claim 14, wherein the rows in the first set of columns have a different frequency than rows in the second set of columns.

16. A mountable sensor assembly comprising:
a sensor circuit;
a sensor housing having walls that define a cavity with an opening for receiving the sensor circuit; and
a cover configured to enclose and seal the opening, the cover being configured to interface with the walls through a ratcheting mechanism, the ratcheting mechanism includes flexible latching fingers that engage solid ridges, the flexible latching fingers have one attached end and one unattached end such that the flexible latching fingers deflect from the attached end as they pass over the apexes of the solid ridges, and then engage respective retention surfaces of the solid ridges to prevent the fingers from reversing over the solid ridges.

17. The assembly of claim 16, wherein the cover comprises flexible latching fingers that engage solid ridges in the walls of the housing.

18. The assembly of claim 16, wherein the walls comprise flexible latching fingers that engage solid ridges in the cover.

19. The assembly of claim 16, wherein the ratcheting mechanism comprises a first set of flexible latching fingers that are offset from a second set of flexible latching fingers.

20. A mountable sensor assembly comprising:
a sensor circuit;
a sensor housing having walls that define a cavity with an opening for receiving the sensor circuit; and
a cover configured to enclose and seal the opening, the cover being configured to interface with the walls through a ratcheting mechanism, the ratcheting mechanism including flexible latching fingers that engage solid ridges, the flexible latching fingers having one attached end and one unattached end such that the flexible latching fingers deflect from the attached end, the flexible latching fingers forming a first set of columns and a second set of columns, rows of the first set of columns being offset from rows of the second set of columns.

* * * * *